(12) United States Patent  (10) Patent No.: US 7,675,208 B2
Bandera  (45) Date of Patent: Mar. 9, 2010

(54) GLOBAL POINTING ACTUATOR

(75) Inventor: Pablo Bandera, Goodyear, AZ (US)

(73) Assignee: Honeywell International Inc., Morristown, NJ (US)

( * ) Notice: Subject to any disclaimer, the term of this patent is extended or adjusted under 35 U.S.C. 154(b) by 590 days.

(21) Appl. No.: 11/551,969

(22) Filed: Oct. 23, 2006

(65) Prior Publication Data

US 2008/0073989 A1  Mar. 27, 2008

Related U.S. Application Data

(60) Provisional application No. 60/827,044, filed on Sep. 26, 2006.

(51) Int. Cl.
*H02K 7/06* (2006.01)
(52) U.S. Cl. .................... 310/80; 310/254.1; 310/261.1
(58) Field of Classification Search .................. 310/80, 310/68 B, 254, 261.4 R
See application file for complete search history.

(56) References Cited

U.S. PATENT DOCUMENTS

| 4,739,241 | A | * | 4/1988 | Vachtsevanos et al. . | 318/568.19 |
| 4,926,122 | A | * | 5/1990 | Schroeder et al. ...... | 324/207.13 |
| 5,204,573 | A | * | 4/1993 | Bederson et al. ............ | 310/198 |
| 5,413,010 | A | * | 5/1995 | Nakanishi et al. ............ | 74/5.22 |
| 6,326,714 | B1 | | 12/2001 | Bandera | |
| 6,803,738 | B2 | | 10/2004 | Erten | |
| 6,879,082 | B2 | | 4/2005 | Erten et al. | |
| 6,906,441 | B2 | | 6/2005 | Mendenhall | |
| 6,909,205 | B2 | | 6/2005 | Corcoran et al. | |
| 7,046,295 | B2 | | 5/2006 | Hovanky | |
| 2004/0189130 | A1 | | 9/2004 | Hovanky et al. | |

FOREIGN PATENT DOCUMENTS

JP  59222069 A  * 12/1984

* cited by examiner

*Primary Examiner*—Quyen Leung
*Assistant Examiner*—Leda Pham
(74) *Attorney, Agent, or Firm*—Fogg & Powers LLC

(57) ABSTRACT

A pointing actuator comprises a spherical base; a plurality of coils wound around an outside surface of the spherical base, wherein at least one coil is wound along latitudinal lines around at least a portion of the spherical base, and at least one coil is wound along longitudinal lines around at least a portion of the spherical base; at least two magnets positioned such that at least a portion of a magnetic field produced by the at least two magnets passes through at least a section of the plurality of coils, wherein current is selectively provided to one or more of the plurality of coils such that a force is generated which causes the at least two magnets to move; and at least one data sensor coupled to at least one of the at least two magnets.

11 Claims, 6 Drawing Sheets

GLOBAL POINTING ACTUATOR

CROSS-REFERENCE TO RELATED APPLICATION AND CLAIM FOR PRIORITY

This application claims the priority of U.S. Provisional Application No. 60/827,044, entitled "GLOBAL POINTING ACTUATOR," filed on Sep. 26, 2006, which is incorporated by reference into the present application. The present application hereby claims priority, under 35 U.S.C. §119(e), to U.S. Provisional Patent Application No. 60/827,044.

BACKGROUND

Vision and sensor systems are important for a wide variety of applications. For example, the gathering and processing of intelligence, surveillance and reconnaissance data is critical to many military and defense applications. Industries that use robotics and automated processes, including automotive and industrial markets, depend on vision and sensor systems to maintain a level of quality and functionality that would be impossible without them. These systems, and others, often use pan/tilt or azimuth/elevation mechanisms (often referred to as gimbals or gimbal systems) to increase their capabilities by effectively increasing their field of view. By allowing the sensor to be pointed in different directions, a single vision or sensor system can be directed at multiple targets or track a particular target over a range of positions.

A gimbal system is usually comprised of multiple motors or actuators with gearing and a connecting structure. Each motor controls an axis of motion. Typically, while one motor moves the sensor (or "payload"), another motor must move the first motor along with the sensor. Consequently, there is an inherent inefficiency in this type of device, which is sometimes called a "motion-on-motion" system. Such systems tend to be relatively large, in order to accommodate all the components required to control each axis. This in turn can limit the speed at which the sensor is moved in any axis. Moreover, the mechanical structure, the gearing, and the motors themselves can cause noise and dynamic disturbances that adversely affect the operation of the sensor.

SUMMARY

The above-mentioned problems and other problems are resolved by the present invention and will be understood by reading and studying the following specification.

In one embodiment a global pointing actuator is provided. The global pointing actuator comprises a spherical base; a plurality of coils wound around an outside surface of the spherical base, wherein at least one coil is wound along latitudinal lines around at least a portion of the spherical base, and at least one coil is wound along longitudinal lines around at least a portion of the spherical base; at least two magnets positioned such that at least a portion of a magnetic field produced by the at least two magnets passes through at least a section of the plurality of coils, wherein current is selectively provided to one or more of the plurality of coils such that a force is generated which causes the at least two magnets to move; and at least one data sensor coupled to at least one of the at least two magnets.

DRAWINGS

The present invention can be more easily understood and further advantages and uses thereof more readily apparent, when considered in view of the description of the following figures in which.

Like reference numbers and designations in the various drawings indicate like elements.

DETAILED DESCRIPTION

Figure 1:
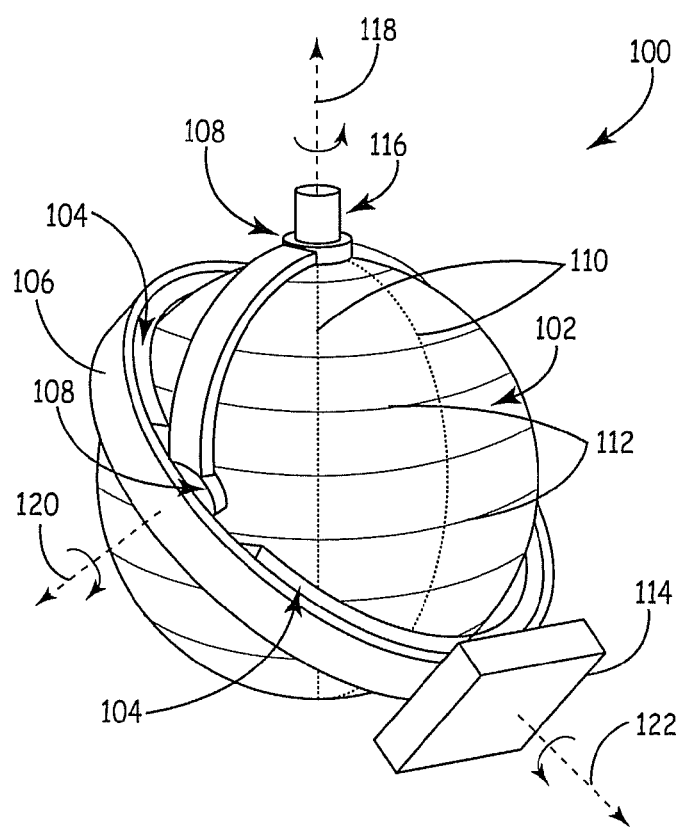
FIG. 1 is a perspective view of a global pointing actuator according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention enable pan/tilt movement of a data sensor in substantially 360 degrees. This allows for maximum field of regard of the sensor. In addition, embodiments of the present invention do not need individual motors or gearing to pan/tilt the data sensor. Therefore, the size and weight of embodiments of the present invention are significantly smaller than other pan/tilt devices, and the speed at which the sensor can move is potentially faster. Moreover, disturbances created by embodiments of the present invention are less than those created by typical pan/tilt mechanisms.

It should be noted that the terms "longitudinal direction" and "longitudinal motion" refer to a direction of increasing or decreasing longitude (e.g. left to right in the accompanying figures.) Additionally, the terms "latitudinal direction" and "latitudinal motion" refer to a direction of increasing or decreasing latitude (e.g. up and down in the accompanying figures.)

FIG. 1 is a perspective view of a global pointing actuator 100 according to one embodiment of the present invention. Global pointing actuator 100 includes a spherical base 102, magnets 104, gimbal 106, longitudinal coil 110, and latitudinal coil 112. In this example, two magnets 104 are shown. However, it is to be understood that, in other embodiments, other appropriate numbers of magnets can be used. Magnets 104 are coupled to gimbal 106. Gimbal 106, in this embodiment, is a two-axis gimbal enabling rotation about axes 118 and 120 via pivots 108. In addition, in some embodiments, gimbal 106 is a three-axis gimbal which enables controlled rotation of data sensor 114 about axis 122 in addition to enabling rotation about axes 118 and 120. If rotation about axis 122 is not desired, gimbal 106 is configured to prevent rolling about axis 122.

Latitudinal coil 112 and longitudinal coil 110 are wound around the outer surface of spherical base 102. In particular, latitudinal coil 112 is wound around spherical base 102 along latitudinal lines and longitudinal coil 110 is wound around spherical base 102 along longitudinal lines. Current is selectively provided to latitudinal coil 112 and longitudinal coil 110. As the current passes through the magnetic field of magnets 104, a force is generated which moves magnets 104 along the surface of spherical base 102. The direction and magnitude of the force is determined by the strength and direction of the magnetic field and the direction/polarity and magnitude of the current flowing through latitudinal coil 112 and longitudinal coil 110.

The force generated by the current traveling through the magnetic field is a Lorentz force. The magnitude and direction of the force can be expressed in the following simple equation for the Lorentz force on a current carrying wire:

$F=l(i \times B)$, where F is the force vector, i is the electric current vector, B is the magnetic field vector, and l is the length of wire in the magnetic field.

The direction of the force vector is determined by the direction of the magnetic field and the direction of the current. Due to the cross product, the resulting force vector will be in a direction orthogonal to both the direction of current flow and the direction of the magnetic field. It should be noted that the force described by this equation is the Lorentz force on the length of coil in the magnetic field. However, under Newton's third law, a force equal in magnitude and opposite in direction is exerted on the magnet producing the magnetic field. Global pointing actuator 100 can be configured so that spherical base 102, latitudinal coil 112 and longitudinal coil 110 are fixed while magnets 104 and gimbal 106 are free to move. Alternatively, global pointing actuator 100 can be configured so that spherical base 102, latitudinal coil 112 and longitudinal coil 110 are free to move while magnets 104 and gimbal 106 are fixed. The magnitude and direction of a magnetic field produced by magnets 104 and the length of coil in the magnetic field are substantially constant. Therefore, the direction and magnitude of the force on magnets 104 is determined by the direction and magnitude of the current in latitudinal coil 112 and longitudinal coil 110.

Latitudinal coil 112 and longitudinal coil 110 are substantially fixed in place on the surface of spherical base 102 in this embodiment, while magnets 104 are free to move via gimbal 106. Therefore, the force produced by current traveling through the magnetic field causes magnets 104 to move along the surface of spherical base 102. In some embodiments, pivots 108 are flexure pivots (e.g. Bendix flex pivots) that provide a restoring force (similar to a stretched spring) which acts in opposition to the force causing magnets 104 to move. The further magnets 104 move, the more restoring force is exerted by pivots 108. Therefore, the position of magnets 104 can be controlled by balancing the restoring force of flexure pivots 108 and the generated Lorentz force.

In other embodiments, pivots 108 are configured to provide little resistance to movement. In some such embodiments, two latitudinal coils 112 and two longitudinal coils 110 are used. Each of the two latitudinal coils covers approximately half of spherical base 102 without overlapping. The direction and magnitude of current in each of the latitudinal coils 112 is controlled independently. Therefore, the position of magnets 104 is controlled by balancing Lorentz forces generated by the two longitudinal coils 110 and balancing the Lorentz forces of the two latitudinal coils 112. Furthermore, in other embodiments, other means of controlling position of magnets 104 are used. For example, pulsing of current through latitudinal coil 112 and longitudinal coil 110, and using gravity as a restoring force.

In operation, current is selectively provided to at least one of latitudinal coil 112 and longitudinal coil 110. A control circuit or processing unit for controlling the direction and magnitude of the current can be located inside of or exterior to spherical base 102. The current traveling through magnetic fields produced by magnets 104 generates a Lorentz force which causes magnets 104 to move. Gimbal 106 helps magnets 104 move along the surface of spherical base 102 in rotations of up to substantially 360 degrees. For example, gimbal 106 helps reduce friction generated by movement of magnets 104 by maintaining magnets 104 just above the surface of spherical base 102. In addition, gimbal 106 can provide mechanical stability. The movement of magnets 104 is minimally limited by mounting post 116 located at the top of spherical base 102 for mounting global pointing actuator 100 to a solid surface, such as a ceiling, wall, ship hull, aircraft, etc.

The position of magnets 104 can be maintained by balancing the generated force with a restoring force, as described above. The position of magnets 104 is communicated to a control circuit, in one embodiment, by placing rotational sensors in pivots 108 to determine the amount of rotation in each of pivots 108. Alternatively, an optical sensor can be placed on at least one of magnets 104 between spherical base 102 and magnets 104. The optical sensor tracks location similar to an optical mouse used in computer systems. In another alternative, position information is provided by a data sensor 114. Position information may be used to provide closed-loop control of the sensor motion.

Data sensor 114, such as a camera, is mounted on at least one of magnets 104. By moving magnets 104, data sensor 114 can be positioned at approximately any position along the surface of spherical base 102. Therefore, global pointing actuator 100 enables data sensor 114 to gather information in virtually any direction around spherical base 102, which increases situational awareness for the area around global pointing actuator 100. In addition, global pointing actuator can be manufactured as a very small device. The size is essentially only limited by the size of spherical base 102 and data sensor 114. Another advantage provided by global pointing actuator 100 is decreased disturbance on the base structure to which it is attached. Since global pointing actuator 100 does not use a motor or gearing to move magnets 104, minimal disturbance is generated.

Figure 2:
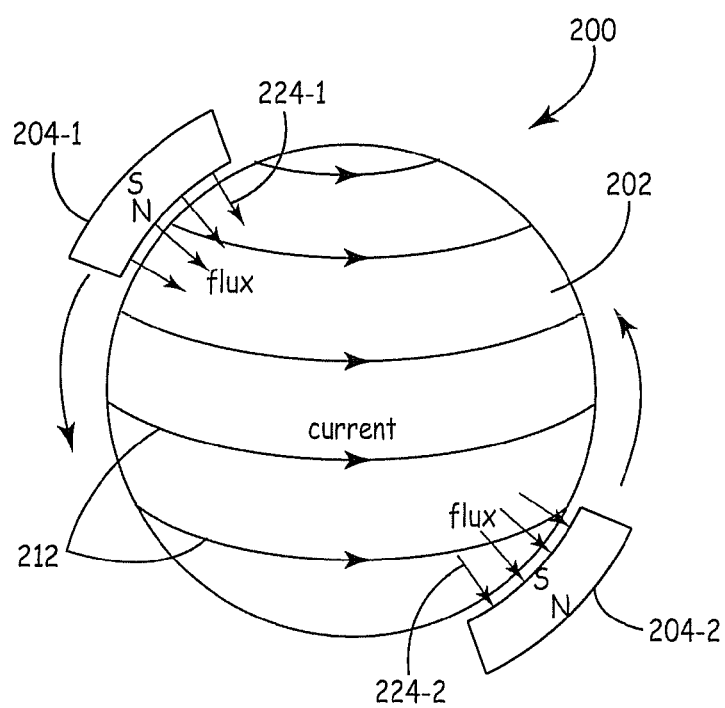
FIG. 2 is a global pointing actuator according to one embodiment of the present invention.

FIG. 2 is a global pointing actuator 200 according to one embodiment of the present invention. FIG. 2 shows how latitudinal (upward and downward) motion of magnets 204 is generated by selectively applying current to latitudinal coil 212. Magnets 204 are arranged such that the polarity of magnet 204-1 relative to spherical base 202 is opposite to that of magnet 204-2. For example, as shown in FIG. 2, the north pole of magnet 204-1 is closer to spherical base 202 than its south pole, whereas the south pole of magnet 204-2 is closer to spherical base 202 than its north pole. By arranging the poles of magnets 204 in this manner, flux lines 224-1 travel away from magnet 204-1 into spherical base 202 and flux lines 224-2 travel into magnet 204-2 away from spherical base 202. Current traveling in the same direction around spherical base 202 through latitudinal coil 212 will, therefore, generate a force in one direction for magnet 204-1 and a force in the opposite direction for magnet 204-2.

For example, current in latitudinal coil 212 traveling left to right on the page in FIG. 2, will generate a force on the portion of latitudinal coil 212 within flux lines 224-1. The direction of the force is generally upward on the page in FIG. 2. Therefore, due to Newton's third law, a force directed generally downward acts on magnet 204-1. Similarly, current in latitudinal coil 212, traveling left to right on the page in FIG. 2, will generate a force on the portion of latitudinal coil 212 within flux lines 224-2. The direction of the force is generally downward on the page in FIG. 2. Therefore, due to Newton's third law, a force directed generally upward acts on magnet 204-2.

Figure 3:
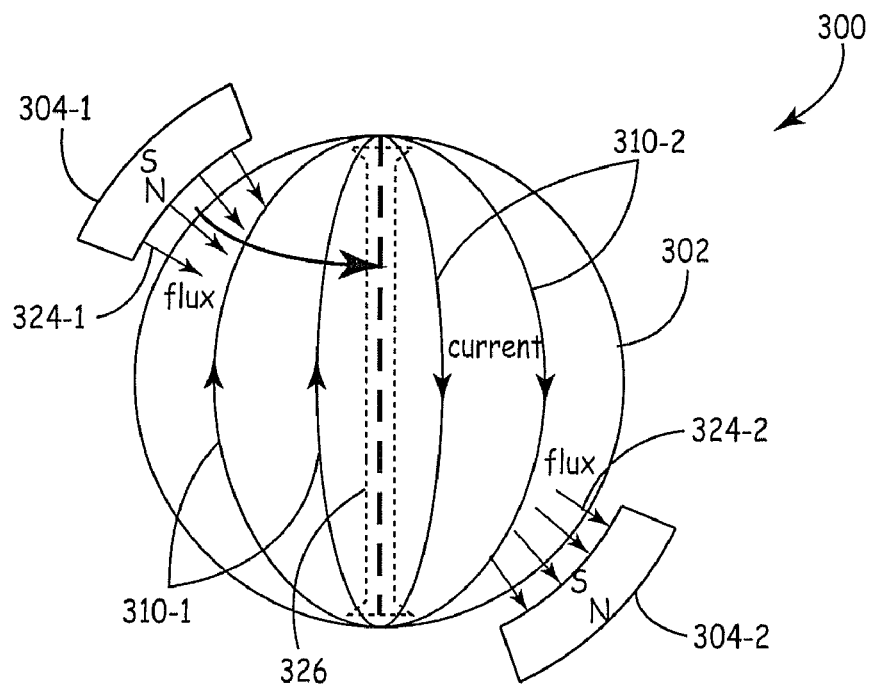
FIG. 3 is a global pointing actuator according to one embodiment of the present invention.

FIG. 3 is a global pointing actuator 300 according to one embodiment of the present invention. FIG. 3 shows how longitudinal (left and right or clockwise and counter-clockwise) motion of magnets 304 is generated by selectively applying current to longitudinal coil 310. Longitudinal coil 310, in this example, comprises at least 2 separate coils 310-1 and 310-2 to which current is independently provided. Each coil is wound around the surface of spherical base 302 and through hollow tube 326. However, it is to be understood that in other embodiments, hollow tube 326 is not used and at least one longitudinal coil is wound around the outer surface of spherical base 302. In such embodiments, movement of magnets 304 is limited to approximately 180 degrees in the latitudinal direction.

Magnets 304 are arranged such that the polarity of magnet 304-1 relative to spherical base 302 is opposite to that of magnet 304-2. For example, as shown in FIG. 3, the north pole of magnet 304-1 is closer to spherical base 302 than its south pole, whereas the south pole of magnet 304-2 is closer to spherical base 302 than its north pole. By arranging the poles of magnets 304 in this manner, flux lines 324-1 travel away from magnet 304-1 into spherical base 302 and flux lines 324-2 travel into magnet 304-2 away from spherical base 302. The direction of current through each of the at least two longitudinal coils 310 is controlled such that a force is generated causing magnets 304-1 and 304-2 to move in the same direction (clockwise or counter-clockwise) around the surface of spherical base 302.

For example, current in longitudinal coil 310-1 traveling upward along the surface of spherical base 302 through flux lines 324-1 will generate a force on the portion of longitudinal coil 310-1 within flux lines 324-1. The direction of the force is generally clockwise around spherical base 302. Therefore, due to Newton's third law, a force directed generally counter-clockwise around spherical base 302 (looking down from the top of the figure) acts on magnet 304-1. Similarly, current in longitudinal coil 310-2 traveling downward along the outer surface of spherical base 302 through flux lines 324-2 will generate a force on the portion of longitudinal coil 310-2 within flux lines 324-2. The direction of the force is generally clockwise around spherical base 302. Therefore, due to Newton's third law, a force directed generally counter-clockwise around spherical base 302 acts on magnet 304-2.

Figure 4:
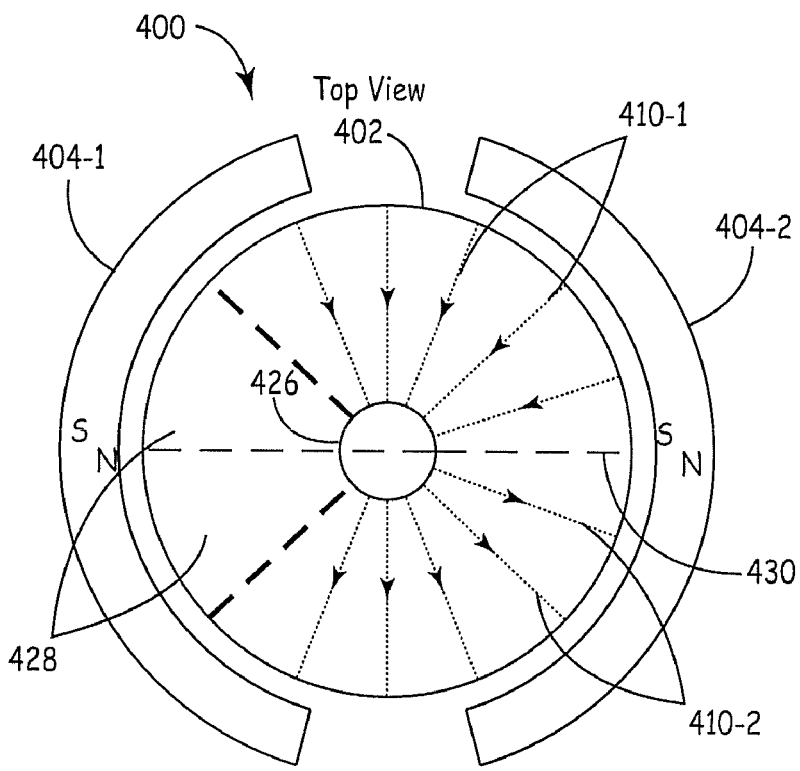
FIG. 4 is a top view of a global pointing actuator according to one embodiment of the present invention.

FIG. 4 is a top view of a global pointing actuator 400 according to one embodiment of the present invention. Global pointing actuator 400 includes longitudinal coils 410-1 and 410-2. Each of coils 410-1 and 410-2 is wound around the surface of spherical base 402 and through hollow tube 426. Coils 410-1 and 410-2 are wound such that they do not overlap. In addition, coils 410-1 and 410-2 are wound such that an area 428 is formed which does not contain portions of either longitudinal coil. It is to be understood that the size of area 428 is provided by way of example only and that the size of area 428 relative to the areas of coils 410-2 and 410-2 may be smaller or larger than shown.

Magnets 404 are arranged such that the polarity of magnet 404-1 relative to spherical base 402 is opposite to that of magnet 404-2. Area 428 helps ensure that magnets 404 do not enter a position in which the forces acting on magnets 404 are completely balanced preventing magnets 404 from moving in a longitudinal direction. For example, in the position as shown in FIG. 4, line 430 divides each of magnets 404-1 and 404-1 approximately in half. Assuming that the field strength of the magnet fields produced by magnets 404-1 and 404-2 are substantially equal, if coils 410-1 and 410-2 are extended into area 428, the forces on magnets 404-1 and 404-2 could balance in such a way as to prevent movement of magnets 404-1 and 404-2.

For example, if area 428 is not used, the generated forces acting on magnets 404-1 and 404-2, due to current through coil 410-1, are approximately equal in magnitude. However, the direction of the force acting on magnet 404-1 is in the opposite direction of the force acting on magnet 404-2 due to the orientation of the North and South poles in each of magnets 404-1 and 404-2. However, by using area 428, as shown in FIG. 4, the magnitude of the force, due to current through coil 410-1, acting on magnet 404-1 is less than the magnitude of the force, due to current through coil 410-1, acting on magnet 404-2. The force acting on magnet 404-2 is greater because more of coil 410-1 is located within a magnetic field of magnet 404-2 than within a magnetic field of magnet 404-1. The forces, therefore, do not balance and magnets 404-1 and 404-2 can continue to move in a longitudinal direction as desired.

Figure 5:
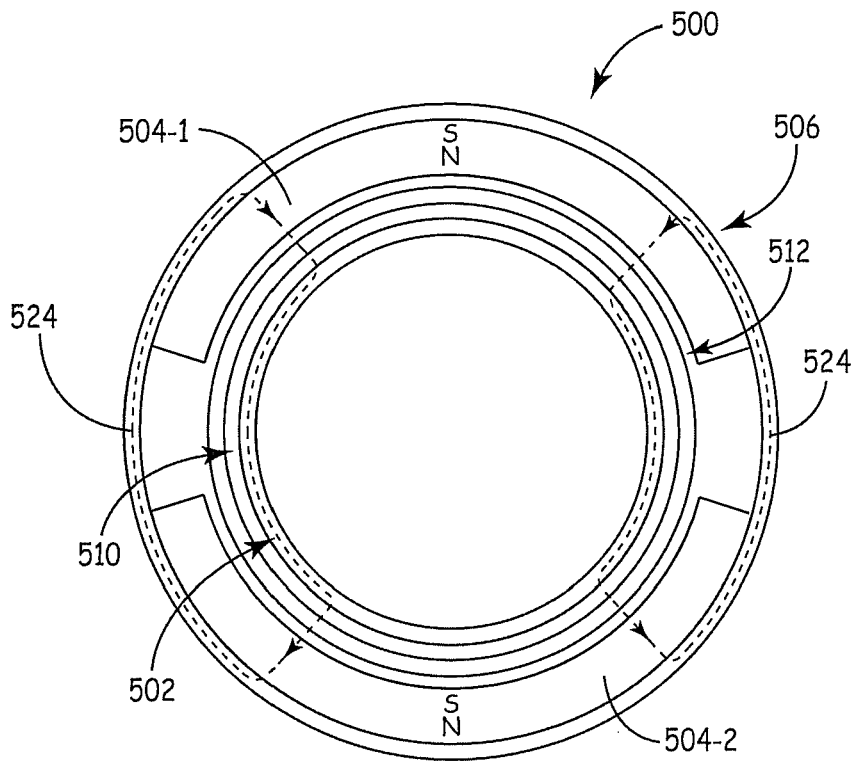
FIG. 5 is a cross-sectional view of a global pointing actuator according to one embodiment of the present invention.

FIG. 5 is a cross-sectional view of a global pointing actuator 500 according to one embodiment of the present invention. Global pointing actuator 500 includes magnets 504-1 and 504-2, longitudinal coil 510, latitudinal coil 512, spherical base 502, and gimbal 506. Spherical base 502 in FIG. 5 is made of a ferromagnetic material such as soft iron. Similarly, gimbal 506 is also made of a ferromagnetic material.

Magnetic fields generated by magnets 504 can be visualized by flux lines 524. For example, flux lines 524 start on the north pole of magnet 504-1 and pass through longitudinal coil 510 and latitudinal coil 512. Base 502, due to its ferromagnetic material, conducts flux lines 524 to the south pole of magnet 504-2. Flux lines continue from the north pole of magnet 504-2 to the south pole of magnet 504-1 via gimbal 506 which is also made of a ferromagnetic material in this example. Hence, the magnetic field in the area of magnet 504-1 is substantially directed in only one direction through latitudinal coil 512 and longitudinal coil 510. Similarly, the magnetic field in the area of magnet 504-2 is also substantially directed in only one direction through latitudinal coil 512 and longitudinal coil 510. By applying appropriate current magnitudes and directions/polarity to each coil, the forces generated on magnets 504-1 and 504-2 do not cancel each other.

The effect of cancelled forces can be understood by contrasting the configuration of global pointing actuator 500 with a configuration in which the generated forces may balance preventing movement of magnets 504. An exemplary configuration with balanced forces is one in which magnet 504-2 is not included. In such an example, flux lines 524 will start at the north pole of magnet 504-1, pass through latitudinal coil 512 and longitudinal coil 510 into spherical base 502, shortly thereafter exit from spherical base 502, and finish on the south pole of magnet 504-1. Hence, in such an example, the magnetic field will be directed in opposite directions in areas near magnet 504-1.

Forces generated by current flowing through latitudinal coil 512 and longitudinal coil 510 will be in one direction when the magnetic field is directed towards spherical base 502 and in the opposite direction when the magnetic field is directed away from spherical base 502. This can then lead to the forces generated by current flowing through latitudinal coil 512 and longitudinal coil 510 within the magnetic field cancelling each other out. However, since spherical base 502 and gimbal 506 are magnetic, and global pointing actuator 500 includes both magnet 504-1 and 504-2, the direction of the magnetic field in the area of either of magnets 504-1 and 504-2 remains substantially in only one direction. Thus, the generated forces do not cancel out, enabling magnets 504 to move in response to the generated forces.

Figure 6:
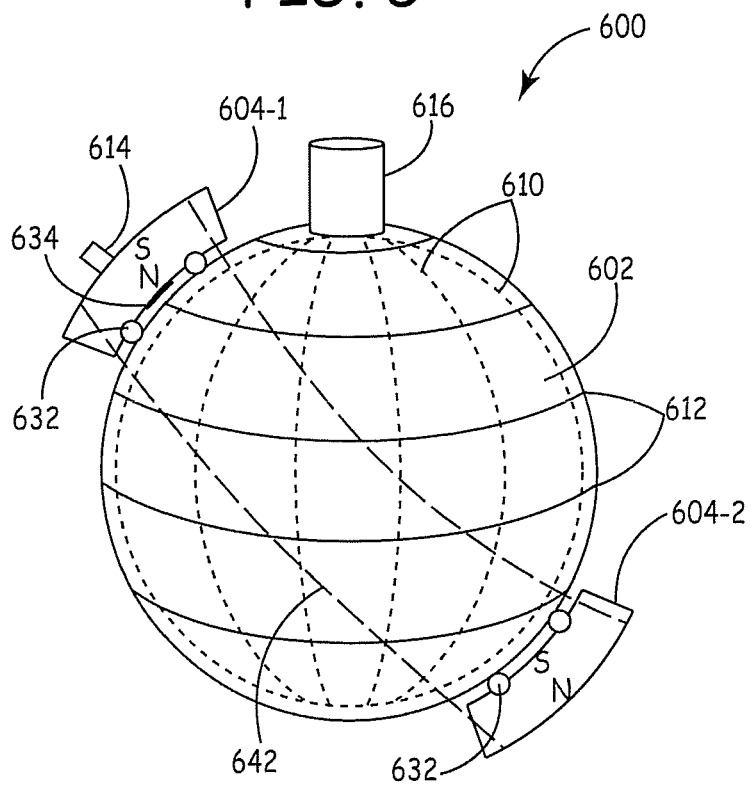
FIG. 6 is a global pointing actuator according to one embodiment of the present invention.

FIG. 6 is a global pointing actuator 600 according to one embodiment of the present invention. Global pointing actuator 600 includes spherical base 602, latitudinal coil 612, and longitudinal coil 610. In addition, global pointing actuator 600 includes magnets 604 located outside base 602. Mounting post 616 is used to attach global pointing actuator 600 to a solid surface as described above.

Global pointing actuator 600 does not have a gimbal coupled to magnets 604. However, magnets 604 are kept in close proximity to base 602 due to the magnetic interaction between magnets 604 and the spherical base 602, which is made of ferromagnetic material. Also, magnet 604-1 is coupled to magnet 604-2 by a ferromagnetic ring 642 similar to the circular part of gimbal 506 in FIG. 5. Ring 642 guides magnetic flux between magnet 604-1 and 604-2 as described above with regards to gimbal 506.

Although a gimbal (such as gimbal 106) helps prevent rolling or twisting of a sensor, such as sensor 614, about a roll axis (e.g. axis 122), embodiments of the present invention do not require a gimbal to prevent such rolling. In particular, sensor 614 in global pointing actuator 600 is prevented from rolling by the force generated on each of magnets 604. The shape of each of magnets 604-1 and 604-2 is configured such that a generated force causes both ends of each of magnets 604-1 and 604-2 to move in the same direction. For example, in order to roll, one end of magnet 604-1 must move in the opposite direction of the other end of magnet 604-1. However, the generated Lorentz force causes both ends of magnet 604-1 to move in the same direction, thereby preventing unwanted roll. Similarly, the generated Lorentz force causes both end of magnet 604-2 to move in the same direction preventing unwanted roll.

When current is supplied to latitudinal coils 612, magnets 604 move up or down in the latitudinal direction due to the forces generated as described above. Similarly, when current is supplied to longitudinal coils 610, magnets 604 move left or right in the longitudinal direction due to the forces generated as described above. Hence, data sensor 614 can be positioned in substantially in any position along the surface of base 602 except for at the mounting post 616.

In order to facilitate movement of magnets 604, bearings 632 are coupled to magnets 604 and contact the outer surface of base 602 in this example. Alternatively, any bearing system (e.g. a low-friction surface) can be used. In addition, position sensor 634 is optionally included between magnet 604 and base 602 to track the position of magnet 604. In this embodiment position sensor 634 is an optical sensor which tracks the location of data sensor 614 similar to an optical mouse used in computer systems. However, it is to be understood that position sensor 634 is not to be limited to an optical sensor. For example, other position sensors include, but are not limited to, a trackball which operates similar to mouse balls used in electronic mice, and miniature sensors which determine position based on rotation of bearings. In addition, in some embodiments, position sensor 634 is not included and information received from data sensor 614 is used to control its position.

Figure 7:
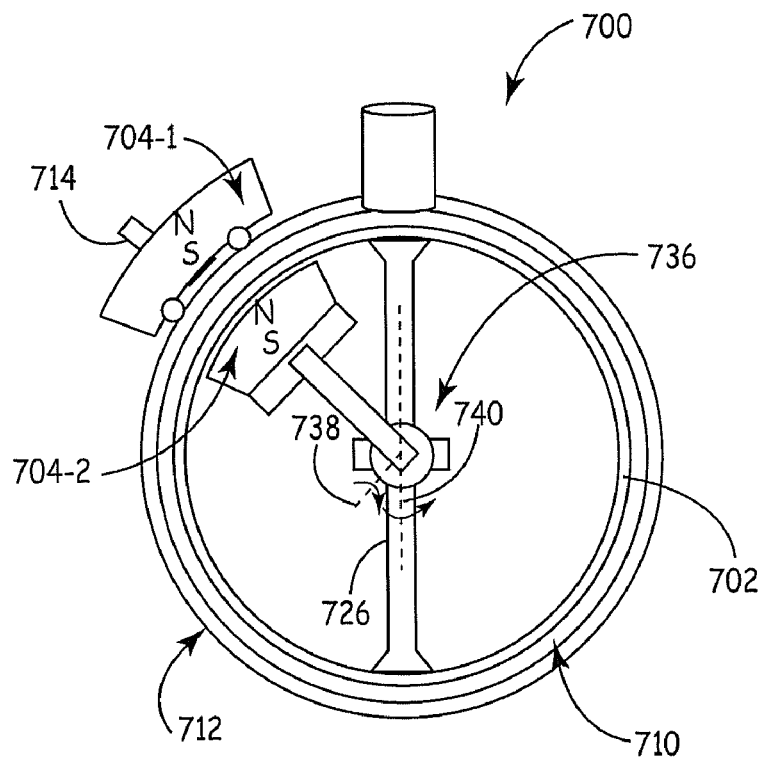
FIG. 7 is a cross-sectional view of a global pointing actuator according to one embodiment of the present invention.

FIG. 7 is a cross-sectional view of a global pointing actuator 700 according to one embodiment of the present invention. Global pointing actuator 700 has one magnet 704-1 located outside base 702 and one magnet 704-2 located inside base 702. As can be seen in the exemplary FIG. 7, the side of magnet 704-1 closest to base 702 has a slightly concave shape and the side of magnet 704-2 closest to spherical base 702 has a slightly convex shape to match the curvature of spherical base 702.

Magnets 704-1 and 704-2 are positioned such that opposite poles are facing each other. For example, in FIG. 7, the south pole of magnet 704-1 is closest to spherical base 702 and faces the north pole of magnet 704-2. Magnet 704-2 prevents magnet 704-1 from sliding off spherical base 702, and prevents twisting or rolling motion of magnet 704-1 relative to magnet 704-2. In addition, magnet 704-2 in conjunction with magnet 704-1 helps maintain the direction of a magnetic field in the area of magnets 704 in one direction through longitudinal coil 710 and latitudinal coil 712 as described above.

Magnet 704-2 is coupled to hollow tube 726 via universal joint 736. Universal joint 736 rotates about axis 738 which goes into the page and axis 740. This rotation enables magnet 704-2 to be positioned substantially anywhere along the inside surface of spherical base 702. In addition, Universal joint 736 is made of a ferromagnetic material which provides a path for flux lines from magnets 704-1 and 704-2. This path through universal joint 736 helps maintain the direction of a magnetic field in the area of magnets 704 in one direction through longitudinal coil 710 and latitudinal coil 712 as described above. Magnets 704-1 and 704-2 are moved due to a generated Lorentz force as described above when a current is applied to one or both of latitudinal coils 712 and longitudinal coils 710.

In addition, rotary sensors can be placed in universal joint 736 to track movement and position of magnets 704-1 and 704-2. In this example, various sources of a restoring force can be used. For example, gravity can be used as a restoring force against which the generated Lorentz force acts. In addition, universal joint 736 in some embodiments, uses springs or flexures to provide a restoring force similar to pivots 108 in FIG. 1 above.

Figure 8:
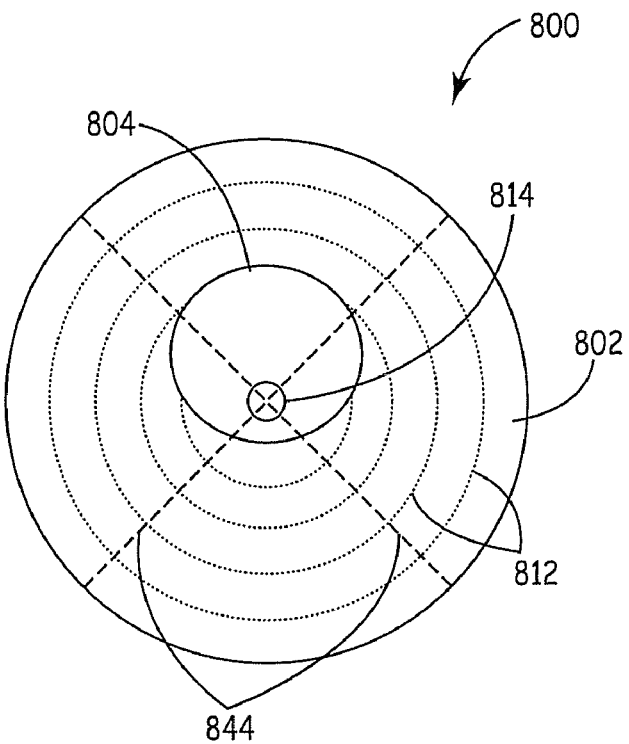
FIG. 8 is a bottom view of a global pointing actuator according to one embodiment of the present invention.

FIG. 8 is a bottom view of a global pointing actuator 800 according to one embodiment of the present invention. A pole of actuator 800 (referred to as the south pole because it is at the bottom of actuator 800) is indicated where the two crosshairs 844 intersect. As can be seen in FIG. 8, data sensor 814 is offset from the center of magnet 804. Due to the offset, data sensor 814 can be located at the south pole of latitudinal coil 812 even when magnet 804 is not itself centered over the south pole. This is advantageous because centering magnet 804 over the south pole can lead to unpredictable behavior in the movement of magnet 804.

Since latitudinal coil 812 is wound around spherical base 802 in a circular manner, latitudinal coil 812 is substantially symmetrical around the south pole. Hence, it cannot be determined with certainty in which direction magnet 804 will travel if centered over the south pole. In addition, Lorentz forces generated when current is supplied to latitudinal coil 812 may cancel out preventing movement of magnet 804. Hence, offsetting data sensor 814 avoids this potential problem by allowing data sensor 814 to be centered over the pole even though magnet 804 is not. It is to be understood that other techniques can be used to avoid potential problems at the south pole, such as by winding latitudinal coil 812 in a manner that it is not symmetrical around the south pole. In addition, movement of magnet 804 can be limited in the latitudinal direction so that it is not centered over the pole. For example, the movement can be limited by a physical barrier, such as a limit to movement of pivots in a gimbal, or by software control of the current applied to latitudinal coil 812.

Figure 9:
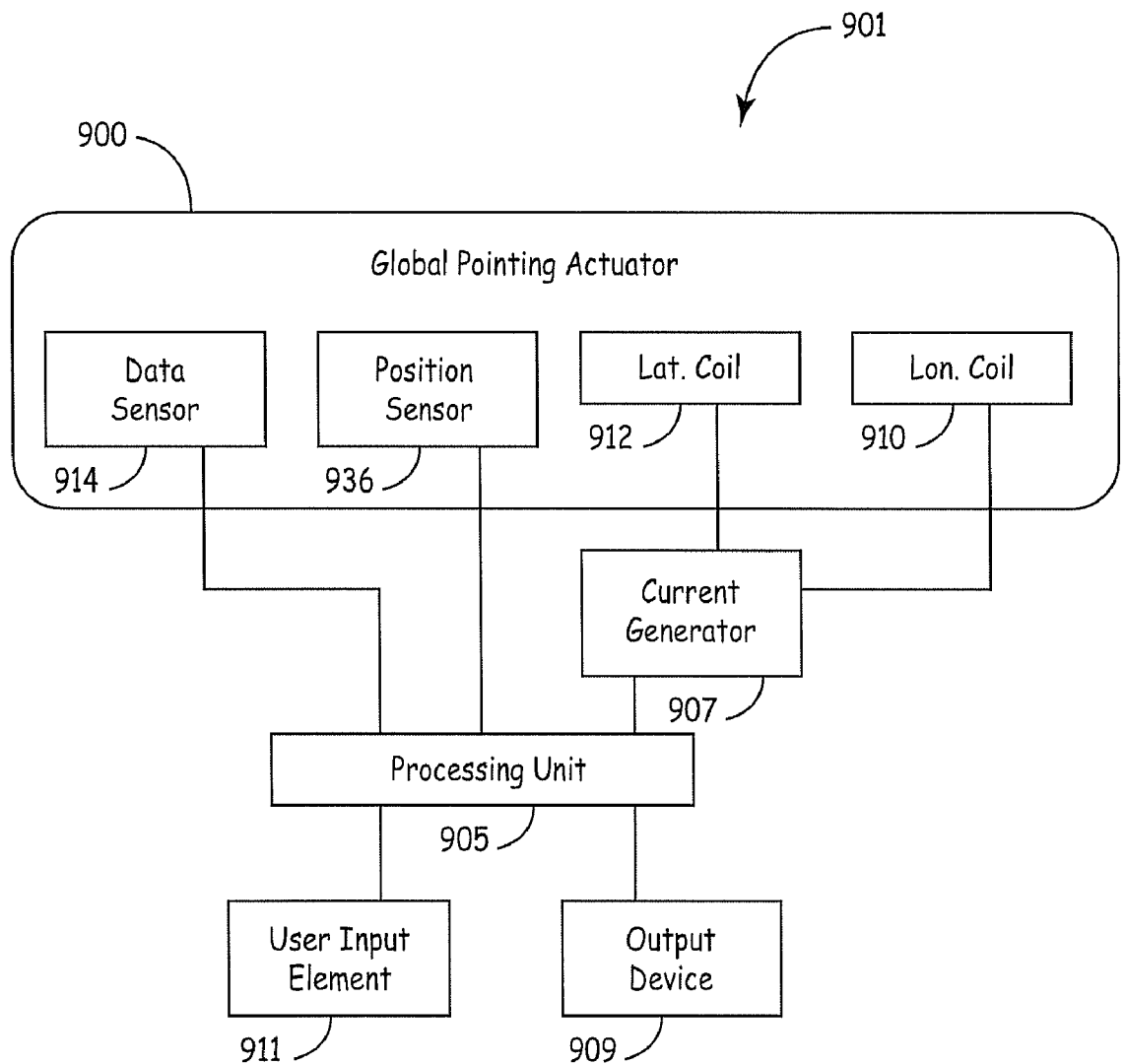
FIG. 9 is a high level block diagram of an electronic system utilizing a global pointing actuator according to one embodiment of the present invention.

FIG. 9 is a high level block diagram of an electronic system 901 utilizing a global pointing actuator 900 according to one embodiment of the present invention. Global pointing actuator 900 can be configured as any of the global pointing actuators described above. System 901 includes a processing unit 905 coupled to various components of global pointing actuator 902. In particular, in this embodiment, processing unit 905 is coupled to at least one data sensor 914 and to at least one position sensor 936. Notably, although processing unit 936 is coupled to at least one position sensor 936 in this embodiment, other embodiments do not include position sensor 936. In addition, processing unit 905 is coupled to a current generator 907 which is coupled to latitudinal coil 912 and longitudinal coil 910.

Processing unit 905 is configured to determine the position of data sensor 914 based on the data received from position sensor 936. Position sensor 936 can include, but is not limited to, an optical sensor, track ball, rotary sensor in a joint, etc. Alternatively, position sensor 936 may not be used at all. Processing unit 905 can be located externally of a spherical base (e.g. spherical base 102) of global pointing actuator 900 or inside the spherical base. Similarly, other electronics such as current generator 907 can be located inside or outside the spherical base of global pointing actuator 900. For wired communications between processing unit 905 and data sensor 914, the wires can be routed out a hollow tube (e.g. hollow tube 326) through the center of the spherical base of global positioning actuator 900. Alternatively, wireless communications can be used to transmit data.

In addition, in some embodiments, global pointing actuator 900 uses a gimbal to allow movement of the magnet to which sensor 914 is coupled as well as to prevent rolling or twisting of the sensor. In one embodiment, the gimbal is in the shape of a spherical metallic shell covering the outer surface of the spherical base with a 180-deg slot for latitudinal motion. This type of gimbal configuration helps provide electro-magnetic interference (EMI) shielding. In other embodiments, the gimbal has a shape similar to gimbal 106 shown in FIG. 1.

Processing unit 905 calculates the magnitude and direction of current to be supplied to latitudinal and longitudinal coils of global pointing actuator 900. The magnitude and direction of the current will cause magnets coupled to data sensor 914 to move, as described above. Hence, by knowing the current location of data sensor 914, processing unit can calculate what current is needed to move data sensor 914 to a new location.

For example, in some embodiments, processing unit 905 is configured to calculate the current needed to move data sensor 914 to a new location from any current position. In other embodiments, data sensor 914 is returned from its current location to a set "home" location prior to moving to a new location. Processing unit 905 then calculates the current needed to move data sensor 914 to the new location from the set "home" or "start" location. Using a "home" location can lessen processing demands on processing unit 905 since processing unit 905 calculates all movements from one "home" location rather than from any potential location on the spherical base of global pointing actuator 900. Processing unit 905 sends signals to current generator 907 to control the desired magnitude and direction of current applied to each of latitudinal coil 912 and longitudinal coil 910.

In addition, processing unit 905 receives and processes data obtained by data sensor 914. Data sensor 914 can include, but is not limited to, a video camera, a still camera, an infrared camera, etc. In some embodiments, processing unit 905 communicates the processed data from data sensor 914 to output device 909. Output device 909 is configured to present the data to a user. For example, output device 909 can include, but is not limited to, a display element, an audio device, a printer, etc. There are many known output devices that are suitable for this task. For example, a suitable display element can include a cathode ray tube (CRT) display, an active matrix liquid crystal display (LCD), or a passive matrix LCD.

In addition, in some embodiments, processing unit 905 is coupled to user input element 911. User input element 911 can include, but is not limited to, keyboards, electronic mice, joysticks, touch screens, microphones, etc. In some embodiments, user input element 911 comprises more than one type of input element. User input element 911 is configured to provide user feedback to processing unit 905. For example, a user can direct or control the movement of data sensor 914 in global positioning actuator 900 by sending signals from user input element 911 to processing unit 905. Processing unit 905 is configured to calculate the magnitude and direction of current to be supplied based on signals received from user input element 911.

Processing unit 905 uses instructions for carrying out the various process tasks, calculations, and generation of signals and other data used in the operation of system 901, such as to control positioning of data sensor 914 of global pointing actuator 900. The instructions can be implemented in software, firmware, analog or digital electronics, or any computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 10:
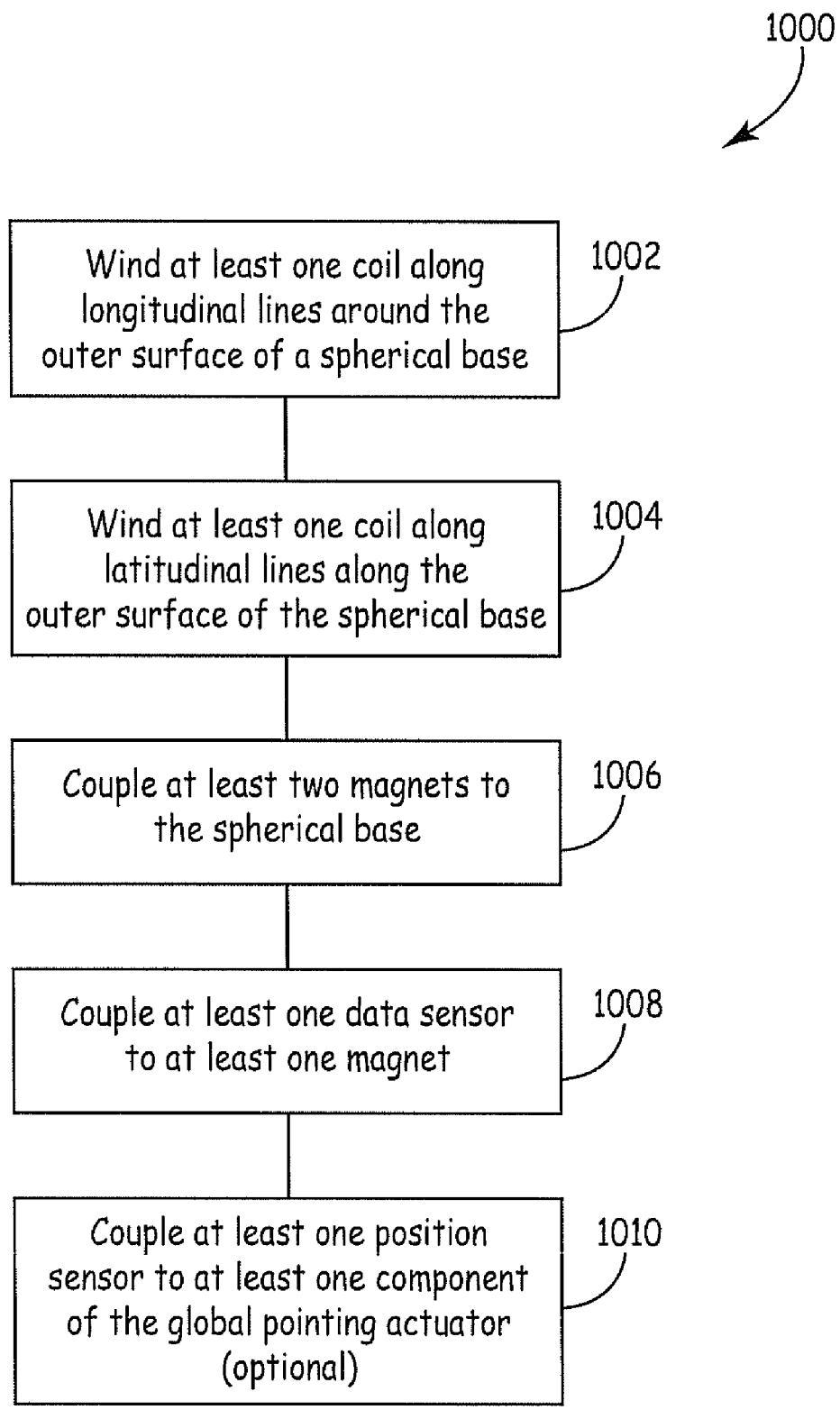
FIG. 10 is a flow chart of a method of manufacturing a global pointing actuator according to one embodiment of the present invention.

FIG. 10 is a flow chart of a method 1000 of manufacturing a global pointing actuator according to one embodiment of the present invention. At 1002, at least one coil (e.g. longitudinal coil 110) is wound along longitudinal lines around the outer surface of the spherical base and through a hollow tube (e.g. hollow tub 326) passing through the center of the spherical base. In some embodiments, the at least two coils are wound such that an area of the outer surface of spherical base (e.g. area 428) does not have any longitudinal coils wound over it, as described above. In addition, the two longitudinal coils do not substantially overlap. In this way, each coil can carry current with different magnitudes and/or direction as described above.

At 1004, at least one coil (e.g. latitudinal coil 112) is wound along latitudinal lines around an outer surface of a spherical base (e.g. spherical base 102). In some embodiments, more than one latitudinal coil is wound around the spherical base. For example, in some embodiments, two latitudinal coils are wound around the spherical base. The two coils do not substantially overlap. One coil is wound around a top hemisphere of the spherical base and the other is wound around a bottom hemisphere of the spherical base. In this way, each coil can carry current with different magnitudes and/or direction as described above.

At 1006, at least two magnets (e.g. magnets 104) are coupled to the spherical base. In some embodiments, one of the at least two magnets is located outside the spherical base (e.g. magnet 704-1) and one is located opposite the first magnet inside the spherical base (e.g. magnet 704-2). In other embodiments, both magnets are located opposite each other outside the spherical base. The magnets can be coupled to the spherical base in various manners. For example, in one embodiment, the magnets are coupled to a gimbal (e.g. gimbal 106) which is in turn coupled mechanically to the spherical base. The gimbal allows the magnets to rotate about two or three axes as well as contributes to preventing unwanted rolling of the at least two magnets (e.g. uncontrolled twisting about axis 122 in FIG. 1). However, it is to be understood that the gimbal is not required to prevent unwanted rolling as described above.

Alternatively, at least two magnets are coupled to the spherical base via magnetic attraction between the magnets and the spherical base. Each magnet is configured with a bearing (e.g. ball bearings or a low-friction material) to facilitate movement of the magnets along the surface of the spherical base. The magnets can be coupled to each other with a ring (e.g. ring 605) to provide a path for magnetic flux from the magnets.

Alternatively, in embodiments with one magnet inside the spherical base, the two magnets are coupled to the spherical base via the strength of magnetic attraction between the two magnets. The magnet outside the spherical base is configured with bearings (e.g. ball bearings or a low-friction material) to facilitate movement of the magnet along the outer surface of the spherical base. The magnet inside the spherical base is coupled to the spherical base via a universal joint (e.g. universal joint 736) which in turn is coupled to the hollow tube. The universal joint provides a path for the magnetic flux from the magnets. In addition, the universal joint can be used to provide a restoring force as described above.

The magnets are coupled such that they produce a magnetic field which passes through at least a section of the at least one latitudinal coil and the at least one longitudinal coil. A force is generated which causes the at least two magnets to move along a surface of the spherical base when current is selectively provided to the at least one latitudinal coil and the at least one longitudinal coil. The magnitude and polarity of the current can be controlled by a processing unit (e.g. processing unit 905) and a current generator (e.g. current generator 907) as described above.

At 1008, a data sensor (e.g. sensor 114) is coupled to at least one of the magnets. The sensor is configured to obtain data, such as image data. The sensor can include, but is not limited to, a video camera, a still camera, an infrared camera, etc. In some embodiments, the sensor is coupled to one of the magnets such that it is offset from the center of the magnet, as described above. In addition, in some embodiments, information from the data sensor is used to control its position.

At 1010, a position sensor is optionally coupled to components of the global pointing actuator to track the position of the data sensor. The position sensor can be coupled to one of the magnets between the magnet and a surface of the spherical base (e.g. position sensor 634). In such an embodiment, the position sensor can include, but is not limited to, an optical sensor or a trackball. In addition, in some embodiments the position sensor is coupled to pivots (e.g. pivots 108) in a gimbal or a universal joint to determine movement of the sensor based on the rotations of the pivots or universal joint. In other embodiments, a position sensor is not used. For example, in some embodiments, information from the data sensor is used to control its position.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A global pointing actuator comprising:
a spherical base;
a plurality of coils wound around an outside surface of the spherical base, wherein at least one coil is wound along latitudinal lines around at least a portion of the spherical base, and at least one coil is wound along longitudinal lines around at least a portion of the spherical base;
at least two magnets positioned such that at least a portion of a magnetic field produced by the at least two magnets passes through at least a section of the plurality of coils, wherein current is selectively provided to one or more of the plurality of coils such that a force is generated which causes the at least two magnets to move; and
at least one data sensor coupled to at least one of the at least two magnets.

2. The global pointing actuator of claim 1, wherein two coils are wound along latitudinal lines around at least a portion of the spherical base, each coil covering approximately half of the global pointing actuator.

3. The global pointing actuator of claim 1, wherein the at least one longitudinal coil comprises two longitudinal coils which are wound such that an area is formed on the outer surface of the spherical base in which no longitudinal coils are wound.

4. The global pointing actuator of claim 1, wherein the position of the at least two magnets is controlled by adjusting the magnitude and direction of current in each of the plurality of coils.

5. The global pointing actuator of claim 1, wherein movement of at least one of the at least two magnets is limited in the latitudinal direction to stop before being centered over a pole of the spherical base.

6. The global pointing actuator of claim 1, further comprising a position sensor coupled to at least one of:
a bottom of at least one of the at least two magnets to track position of the data sensor; and
in pivots of a gimbal coupled to the at least two magnets.

7. The global pointing actuator of claim 1, further comprising a gimbal configured to couple the at least two magnets to the spherical base, wherein the gimbal rotates about at least two axes via at least two pivots.

8. The global pointing actuator of claim 1, wherein the at least one longitudinal coil is wound along longitudinal lines around at least a portion of the spherical base and through a hollow tube passing through the center of the spherical base.

9. The global pointing actuator of claim 1, wherein one of the at least two magnets is located inside the spherical base and another of the at least two magnets is located outside the spherical base.

10. The global pointing actuator of claim 1, wherein each of the at least two magnets is configured such that the generated force does not cause the at least two magnets to roll.

11. The global pointing actuator of claim 1, wherein the at least two magnets are coupled together by a ferromagnetic ring.

* * * * *